2,886,425

PROCESS OF MAKING SODIUM METABORATE AND COMPOSITIONS COMPRISING THE SAME

Frank J. Seibert, Bound Brook, N.J., assignor to Chipman Chemical Company, Inc., Bound Brook, N.J., a corporation of New York No Drawing. Application July 31, 1953
Serial No. 371,710

13 Claims. (Cl. 71—2.2)

This invention relates to a process of making hydrated crystalline sodium metaborates, to a method of co-crystallizing a mixture thereof with sodium chlorate, and to the co-crystallized mixture of sodium chlorate and sodium metaborate obtained thereby.

Sodium metaborate, often written as $NaBO_2$, but generally as $Na_2B_2O_4$, is commonly described in the literature as being made by the fusion of borax with sodium carbonate with the elimination of carbon dioxide. This obviously will result in an anhydrous product and is not suitable for my purposes. The metaborate also exists in at least two hydrated forms, $Na_2B_2O_4 \cdot 4H_2O$ and $Na_2B_2O_4 \cdot 8H_2O$, either of which is more suitable for my purposes than the anhydrous form, as will be described later. These hydrated forms have been obtained heretofore, to the best of my knowledge, only by slow crystallization from solutions in water, a technique that is not suitable to large scale manufacturing operations of an inexpensive product.

The most common existing form of any sodium salt of boric acid is borax. It is sodium biborate (sometimes but erroneously referred to as tetraborate) of the formula $Na_2B_4O_7$. This is readily available in forms containing either five or ten molecules of water of crystallization, namely, $Na_2B_4O_7 \cdot 5H_2O$ or $Na_2B_4O_7 \cdot 10H_2O$. Since these are the most abundant forms of economically available sodium borate, other borates, including the metaborate, may be made from them if a suitable conversion process is available. From a theoretical point of view, borax and sodium metaborate have the relation indicated by the following equation (omitting for simplicity any water of crystallization):

$$Na_2B_4O_7 + Na_2O \rightarrow 2Na_2B_2O_4$$

The sodium metaborate prepared in accordance with the method of this invention is a hydrated form and has an average of four to eight molecules of water of crystallization. This form of sodium metaborate may be utilized in accordance with my invention in compositions in which the borate is to impart resistance to fire, and accordingly, the water of crystallization is an important element of the composition. Generally, the larger the amount of water in the metaborate the better fireproofing properties the material imparts to the composition in which it is contained, or to which it is applied. This is especially so when the metaborate is used in combination with a chlorate to reduce the fire hazard of the latter.

The process of my invention can be described best after a consideration of the following theoretical reactions:

$$Na_2B_4O_7 \cdot 5H_2O + 2NaOH + 10H_2O \rightarrow 2Na_2B_2O_4 \cdot 8H_2O \quad (I)$$

$$Na_2B_4O_7 \cdot 5H_2O + 2NaOH + 2H_2O \rightarrow 2Na_2B_2O_4 \cdot 4H_2O \quad (II)$$

$$Na_2B_4O_7 \cdot 5H_2O + 2NaOH + 6H_2O \rightarrow Na_2B_2O_4 \cdot 4H_2O + Na_2B_2O_4 \cdot 8H_2O \quad (III)$$

$$Na_2B_4O_7 \cdot 10H_2O + 2NaOH + 5H_2O \rightarrow 2Na_2B_2O_4 \cdot 8H_2O \quad (IV)$$

$$Na_2B_4O_7 + 2NaOH + 15H_2O \rightarrow Na_2B_2O_4 \cdot 8H_2O \quad (V)$$

$$Na_2B_4O_7 \cdot 10H_2O + 2NaOH + H_2O \rightarrow Na_2B_2O_4 \cdot 4H_2O + Na_2B_2O_4 \cdot 8H_2O \quad (VI)$$

$$2Na_2B_4O_7 \cdot 10H_2O + Na_2B_4O_7 \cdot 5H_2O + 6NaOH \rightarrow 5Na_2B_2O_4 \cdot 4H_2O + Na_2B_2O_4 \cdot 8H_2O \quad (VII)$$

In all of the above formulae it will be noted that they have in common the step of starting with borax which reacts with sodium hydroxide in the presence of only sufficient water, obtained as an added ingredient, and/or as the water of crystallization in the borax, and/or from reaction by the caustic, to supply the water for the hydrated metaborate.

In accordance with my process it is possible to make a final granular, friable, product following closely to the above equations in which all or most of the water appears in the product as water of crystallization. In some cases a small amount of water may be carried by the product in uncombined form without detriment to it.

In carrying out my invention the borax, sodium hydroxide and any additional water that is required in the process, is placed in a mixer. The ingredients are agitated for a period up to several hours. The mixture goes through several phases and becomes a granular friable product.

In all of the above methods heating or cooling may be used to facilitate the process and prolong or shorten the time. The process may be carried out in a relatively short time.

Another great advantage of the process is that excess water is not required and that there is no need to evaporate any water, or to handle mother liquor, or to otherwise utilize any complicated normal crystallization techniques.

Still another advantage of the process is that the material obtained is readily worked in the mixer at all stages, and large power requirements are not necessary even as the material is going through the final crystallization stage.

I will describe my invention in connection with the first equation written above as the best mode contemplated for carrying out my invention. The borax with five molecules of water of crystallization, known as octahedral borax, is readily available on the market and the metaborate product with the maximum water is desired because of its enhanced fire-proofing properties.

As illustrative of the preferred embodiment of the process, 240 pounds of the octahedral borax (five molecules of water of crystallization) are placed in a mixer provided with twin mixing knives and a jacket through which cooling water may be circulated. To this is added 72 pounds of caustic soda dissolved in 144 pounds of water. The amounts are approximately those required by Equation I. The material is at room temperature (70–80° F.) and upon agitation, it readily forms a very liquid slurry. Within a few seconds of additional agitation, the material goes through a very sticky viscous phase, following which it again partially liquifies as agitation is continued. A certain amount of heat is developed because of the reaction and if cooling water is not supplied, the temperature may rise ten or more degrees, since the increase in temperature prolongs the process, and has a tendency to reduce the amount of combined water, it is desirable to absorb this heat by cooling water in the jacket, although this is not essential if obtaining the maximum final combined water is not important. As the mixing continues, the product gradually becomes thicker and more sticky and then goes through a moist crystalline mass much the consistency of moist brown sugar. As the reaction is continued, the material becomes a light, crystalline mass having a slight moist texture to the touch.

In the above preferred embodiment neither heating nor cooling is essential, although cooling hastens the process. It is an advantage of this embodiment that heating is not required.

It is important to note that if the ingredients are merely all dissolved or liquefied and then permitted to cool and set, my product is not obtained. It appears to be obtained only during agitation of the mixture. Apparently the agitation is important in effecting the reaction and in developing the crystal structure which gives the final product described.

The amount of the water that is chemically combined as water of crystallization and that which stays in the crystalline mass in uncombined form, if any, varies slightly with the mixing conditions. The lower the temperature and the longer the mixing, the more water that is combined. For instance, when the process is carried out at a temperature of about eighty degrees and mixing for two hours, an average of about six and one-half molecules of water will be permanently combined. This is shown by the fact that if the material is exposed to the atmosphere it will lose weight due to evaporation of moisture down to an average of about six and one-half molecules of water of crystallization. When, however, the temperature is cooled down to seventy degrees or below and the mixing is continued for about one hour, the product will contain substantially all of the water combined as water of crystallization, and will lose correspondingly less if exposed to the atmosphere.

Whether or not all of the water is combined as water of crystallization, or a part merely is absorbed in the finished granular product, is of relatively little importance when the hydrated metaborate is to be used for fireproofing a composition. The effect of the water is to held retard the fire and it is immaterial whether it is entirely present as water of crystallization, or some merely absorbed in the product.

The important thing and one of the features that has been discovered in accordance with my invention and which was unobvious to me, is the fact that any small amount of water remaining in the product that is not chemically combined as water of crystallization is not disadvantageous and does not give the product objectionable properties. If a physical dry product is required, this uncombined water will evaporate if the product is allowed to "cure" unheated or if dried at a temperature low enough to avoid melting. Even after storage the product remains a friable crystalline material readily handled and moved from one container to another. The absence of solid, hard caking, even if the product dries out, is extremely important since it renders the product utilizable even though any uncombined water may eventually evaporate.

The product can readily be packed in moisture-proof containers such as polyethylene-lined bags and any uncombined moisture in the product retained for long periods of time.

It is unobvious according to my invention, that substantially all of the water could be combined in the product as water of crystallization without the presence of large amounts of excess water, and that any water which is not combined as water of crystallization does not have any harmful effect upon the product.

The process may be practiced as long as the relative amounts of borax and caustic are substantially in the ratios indicated and as long as the amount of water is not substantially in excess of the amount required to give the wanted hydrated metaborate product. The mixing time and temperature may be varied as desired. Nothing is lost but time and power if the mixing is continued after the desired product is formed. Naturally, the final temperature must not be above that at which the hydrated product will crystallize, and the lower the crystallizing temperature the shorter the time. This suggests that a higher temperature might be used at first to facilitate the reaction and then the temperature may be lowered to facilitate crystallization. This is especially so when unhydrated borax is used or where the amount of added free water is relatively small.

Humidity is also a factor. For example, if the relative humidity exceeds 72% at a mixing temperature of 81° F., the mix will tend to stay more soggy, and not become granular as readily. Such a product is more difficult to handle. However, its utility is in no way impaired, and its resistance to fire is greater than that of the same material after drying.

In the above process the amounts need not be precisely controlled. If, for example, the amount of caustic is slightly less than the theoretical amount, the final product will be a mixture of the metaborate and a small quantity of unreacted borax. It will be primarily the metaborate, and the presence of a small amount of uncoverted borax is usually not objectionable since such small amounts do not exceed the solubility limitations. The solubility decreases as the unreacted borax increases. On the other hand, if small amounts of excess of caustic are used, this will remain in the product and improve the solubility. Since the metaborate is itself alkaline and since for a number of purposes, particularly when used in combination with a chlorate for defoliating, the alkalinity is desirable, it may be important in some instances to use a slight excess of the amount of caustic, such as 1 to 2%, in order to assure and maintain the alkalinity and alkaline reserve in the final product. If slightly more water than required by the equations is used, the product would be more damp. Reference to the amount of water to hydrate the metaborate does not exclude additional water, but the amount of water should not be in excess of that which can be absorbed in a solid crystalline product. Reference herein to the amounts is intended to be approximate and to include the variation of the above-described type.

Many of the processes embraced within the equations above described heretofore utilize added free water on the left hand side of the equation in addition to the caustic soda, and this permits at least a part if not all of the caustic to be purchased and used as a concentrated solution, such as a 50 or 75% solution of caustic. Caustic soda as a raw material in this solution form is much cheaper than solid caustic and this also helps to reduce the cost of the process and the cost of the final product. The metaborate is also much less expensive than the sodium pentaborate, another form of borate that is more soluble than borax. The pentaborate is made by combining boric acid and borax, and boric acid being considerably more expensive than caustic makes the pentaborate more expensive than the metaborate. The metaborate also has a marked solubility advantage. Borax is relatively insoluble whereas the metaborate is extremely soluble and can be included in formulations in a concentrated liquid form. Considering the factors of solubility, fire-proofing properties, and economics, the metaborate is ideal and my process is simple and readily adapted to the manufacture of the metaborate.

The metaborate obtained in accordance with my process is admirably suited as an ingredient for a mixture with sodium chlorate, and the sodium chlorate in such a mixture may advantageously be crystallized with the sodium metaborate during the manufacture of the latter.

There are numerous proposals for the use of sodium chlorate as a weed killer and more recently it has been proposed as a defoliant for cotton and other plants. Sodium chlorate by itself, however, presents too great a fire hazard to be used by itself. Accordingly, it is more common to use it with some material that reduces the fire hazard such as a hydroscopic material or a fire retardant.

Borax is known to have fire retarding properties, but it is so slightly soluble that not enough borax can be dissolved in a solution of sodium chlorate to render the material fire-proof after application. For instance, if the chlorate composition is to be dissolved at the rate of about one pound per gallon, a figure quite common in weed killing and defoliating practices, it would be possible to dissolve only about one-fourth pound of borax in such a solution and this would not have adequate fire-proofing properties.

It has been proposed heretofore to kill weeds with a solution of sodium chlorate and sodium metaborate but this mixture has been available only in the liquid form. Since the sodium metaborate is quite soluble, it is possible to prepare concentrated solutions of sodium chlorate and sodium metaborate which can be shipped in tank cars or in drums and diluted to the proper extent before application. As far as I am aware, no one heretofore has prepared a sodium chlorate and sodium metaborate product in solid form that has satisfactory physical properties especially one in which the two ingredients are at least in part co-crystallized so as to give a uniform, non-stratifying composition.

It has been proposed heretofore to include sodium pentaborate in combination with sodium chlorate for minimizing fire hazards. The pentaborate, however, is neutral or slightly acid, and does not have the optimum use properties of the alkaline metaborate. The pentaborate is made only at a relatively great expense since it is made from a combination of six mols of boric acid with one mol of borax, and boric acid is a relatively expensive raw material for products of this type.

In accordance with my invention the sodium chlorate to be included in combination with the sodium metaborate may be added to the mixture before the mixing is complete, i.e., before all of the water has combined with the metaborate as water of crystallization. In one form the sodium chlorate may be added at the start of the mixing operation after the other ingredients. This process has the advantage of simplicity but requires a somewhat longer time for the final crystalline product to be formed.

In the best mode contemplated for making the chlorate-metaborate mixture, the borax, caustic soda, and any water required is placed in the mixer and mixed until the product comes to a moist but non-sticking crystalline mass. This may be after a period of about 50 to 60 minutes mixing at a temperature of about 70 to 80°. There may be from 1 to 3 molecules of water uncombined. The water will, of course, be saturated with the metaborate. At this time, all of the sodium chlorate in dry form is added and the product becomes much more-dry-appearing and may be finished off with only a relatively few minutes of further mixing. This effect of the chlorate in giving a dryer appearance to the crystalline mass may be explained by the fact that the chlorate is extremely soluble and dissolves in some of the uncombined water, which is already saturated with sodium metaborate. Due to the resulting supersaturation, the sodium chlorate and sodium metaborate co-crystallize, giving an entirely different appearance and physical characteristic to the uniformly mixed, crystalline mass.

The final chlorate-metaborate product is a granular, crystalline composition, which is suitable for the control of vegetation such as weed killing and defoliating, and which consists essentially of sodium chlorate and sodium metaborate. The chlorate is in an amount effective for controlling the vegetation and the metaborate is in amount sufficient to overcome the flammability of the chlorate. Each discrete granule of the composition is composed of crystalline sodium metaborate and crystalline sodium chlorate generally in substantially the proportions of the composition, and at least a portion of each of the crystalline sodium metaborate and crystalline sodium chlorate in each granule has been co-crystallized from a common menstruum.

The proportions of the sodium chlorate and sodium metaborate may vary over relatively wide ranges generally within the range of 25 to 60% sodium chlorate and 40 to 75% sodium metaborate, more commonly the sodium chlorate will comprise at least about 40% of the mixture and 40 to 50% is the more common range, the balance being essentially the hydrate of sodium metaborate.

The fire retardant properties of the composition may be readily demonstrated by mixing a gram or two of the chlorate-metaborate composition made in accordance with the process, with an equal weight of dry fine sawdust, and applying either indirect heat or direct flame until ignition takes place. If the heat or flame is then immediately removed, burning may continue at the same rate, or it may continue at a reduced rate, or it may stop altogether, depending on the proportion of sodium metaborate present. When a mixture of sodium chlorate and sawdust, but without metaborate, is similarly heated, ignition is explosive and instantaneously complete.

The composition has weed killing and defoliant properties and the alkaline nature of the sodium metaborate, particularly if a slight excess of caustic is used in making it, seems to accelerate the herbicidal or defoliant action of the sodium chlorate.

The expression "consisting essentially of" is used in this application to mean that the sodium chlorate and the sodium metaborate are the components essential for the purposes described. This is meant to exclude from the composition only those ingredients in those amounts which would nullify the advantageous properties of the composition and not to exclude inert materials or other ingredients that had no effect, or other ingredients that have some other independent effect, such as hydroscopic agents, wetting agents, etc., without detracting from the advantages described therein. This is in accordance with the recognized meaning of this expression.

The invention has been described in connection with sodium chlorate and sodium metaborate, because of their economic advantages. It will be obvious that potassium and other alkali metals are the equivalent of sodium in this connection.

The term "ambient temperature" as used in the claims includes the normal rise in temperature of the mix due to heat released therein arising from the heat of solution of caustic soda, heat of dilution of caustic soda solution, and heat of reaction.

I claim:

1. The process of making a hydrated sodium metaborate having at least four molecules of water of crystallization, which comprises mixing a sodium biborate with added free water and approximately two mols of caustic soda for each mol of biborate at ambient temperature the amount of water being limited to that obtained from the water of crystallization in said biborate, from reaction with the caustic, and from added free water, the total quantity of water present being sufficient at most to convert said biborate to a metaborate octahydrate, until a granular hydrated sodium metaborate is obtained.

2. A process in accordance with claim 1 which includes cooling the reaction mixture during the reaction in order to maintain ambient temperature and remove the heat liberated in the course of the reaction.

3. A process in accordance with claim 1 which includes permitting the temperature to rise after mixing has begun due to heat liberated in the course of the reaction and then cooling the reaction mixture after reaction is substantially complete until a granular hydrated sodium metaborate is obtained.

4. A process in accordance with claim 1 which includes limiting the amount of water present to obtain a hydrated sodium metaborate having an average of four to eight molecules of water of crystallization.

5. A process in accordance with claim 4 in which the amount of water is limited to that required to produce a hydrated sodium metaborate having at least eight molecules of water of crystallization.

6. A process in accordance with claim 1 in which the biborate is octahedral borax, $Na_2B_4O_7 \cdot 5H_2O$.

7. A process in accordance with claim 1 in which the biborate is borax, $Na_2B_4O_7 \cdot 10H_2O$.

8. A process in accordance with claim 1 in which the mixture is mixed at a temperature within the range from 70 to 80° F. during the reaction.

9. A process of making a cocrystallized hydrated sodium metaborate-sodium chlorate which comprises mixing a sodium biborate with added free water and approximately two moles of caustic soda for each mol of biborate at ambient temperature the amount of water being limited to that obtained from the water of crystallizaion in said biborate, from reaction with the caustic, and from added free water, the total quantity of water present being sufficient at most to convert said biborate to a metaborate octahydrate, until a granular partially hydrated sodium metaborate is obtained, and before all of the water is combined as water of crystallization of the metaborate, adding and dissolving sodium chlorate therein, and continuing the mixing to give a granular product in which substantially all of the chlorate is cocrystallized with hydrated metaborate.

10. A process in accordance with claim 9 in which the amount of chlorate added is within the range from 25 to 60% by weight of the metaborate-chlorate mixture.

11. A process in accordance with claim 9 in which the biborate is octahedral borax, $Na_2B_4O_7 \cdot 5H_2O$.

12. A process in accordance with claim 9 in which the biborate is borax, $Na_2B_4O_7 \cdot 10H_2O$.

13. A process of making a cocrystallized hydrated sodium metaborate-sodium chlorate which comprises mixing sodium chlorate, added free water and a sodium biborate and approximately two mols of caustic soda for each mol of biborate at ambient temperature the amount of water being limited to that obtained from the water of crystallization in said biborate, from reaction with the caustic, and from added free water, the total quantity of water present being sufficient at most to convert said biborate to a metaborate octahydrate, until a granular hydrated sodium metaborate is obtained, in which substantially all of the chlorate is cocrystallized with hydrated metaborate.

References Cited in the file of this patent

UNITED STATES PATENTS

| | | |
|---|---|---|
| 1,976,299 | Russell | Oct. 9, 1934 |
| 2,700,604 | Knight | Jan. 25, 1955 |

FOREIGN PATENTS

| | | |
|---|---|---|
| 337,322 | Germany | May 25, 1921 |
| 532,989 | France | Nov. 25, 1951 |

OTHER REFERENCES

Mellor: "A Comprehensive Treatise on Inorganic and Theoretical Chemistry," vol. 5 (1924), page 67.

UNITED STATES PATENT OFFICE
CERTIFICATE OF CORRECTION

Patent No. 2,886,425                  May 12, 1959

Frank J. Seibert

It is hereby certified that error appears in the printed specification of the above numbered patent requiring correction and that the said Letters Patent should read as corrected below.

Column 2, line 1, formula (V) should read as shown below instead of as in the patent —

$$Na_2B_4O_7 + 2NaOH + 15H_2O \rightarrow 2Na_2B_2O_4 \cdot 8H_2O$$

column 5, line 49, for "ime" read -- time --.

Signed and sealed this 6th day of October 1959.

(SEAL)
Attest:

KARL H. AXLINE
Attesting Officer

ROBERT C. WATSON
Commissioner of Patents